United States Patent Office 3,499,063
Patented Mar. 3, 1970

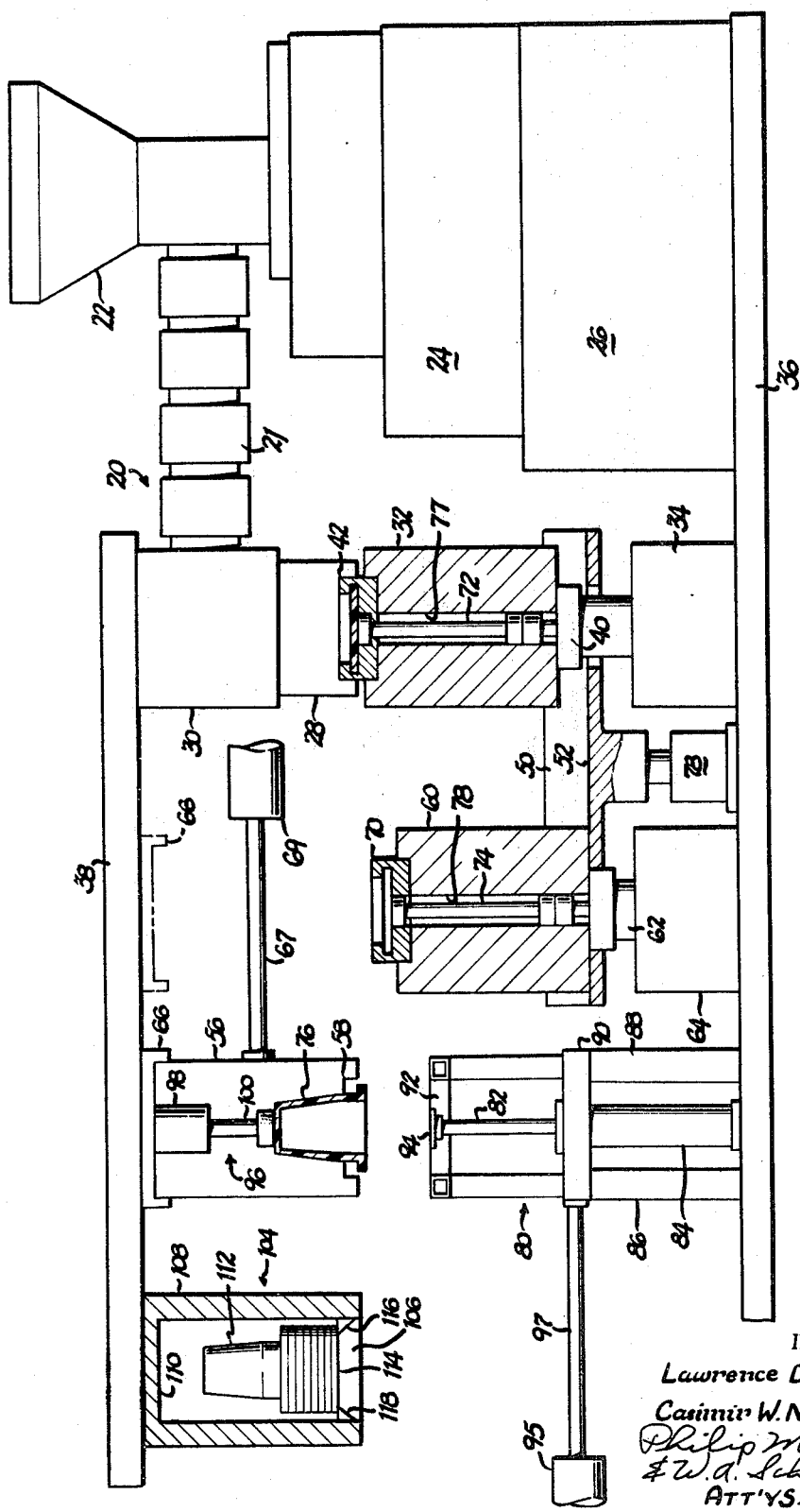

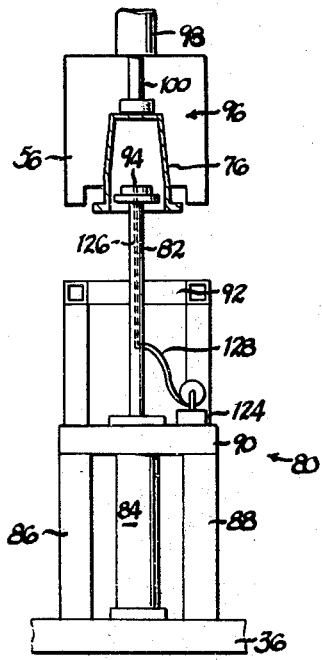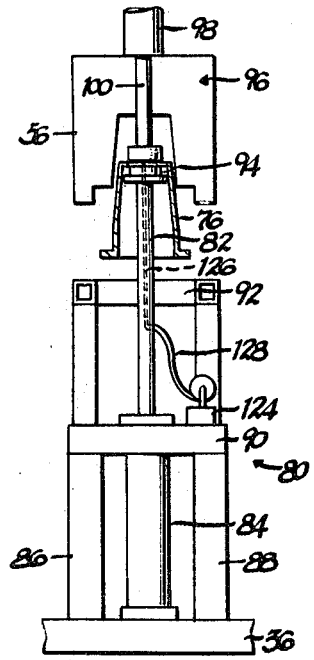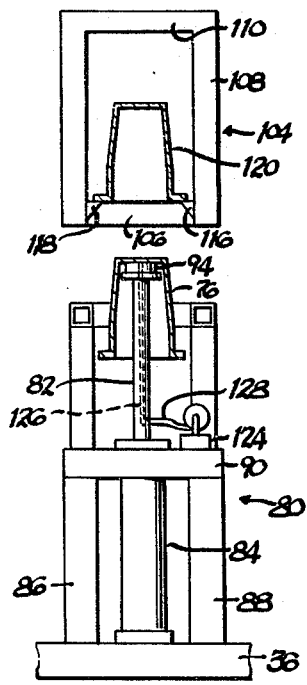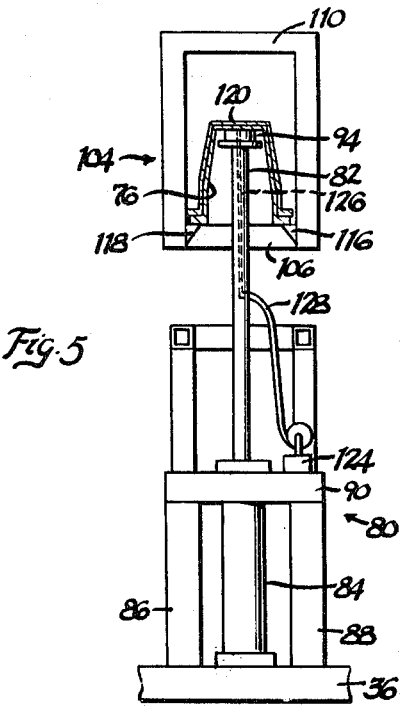

3,499,063
APPARATUS AND METHOD FOR COLLECTING MOLDED ARTICLES
Lawrence D. Ninneman and Casimir W. Nowicki, Toledo, Ohio, assignors to Owens-Illinois, Inc., a corporation of Ohio
Filed Dec. 27, 1966, Ser. No. 604,987
Int. Cl. B65g 57/00
U.S. Cl. 264—40                10 Claims

ABSTRACT OF THE DISCLOSURE

This invention relates to methods of and apparatus for collecting finished plastic articles from a molding machine, and more particularly to the collecting of such articles and arranging them in a stack so that each article which is ejected from the molding machine is automatically inserted into the stack in nested relation with the other articles in the stack.

---

In certain known plastic molding machines for making plastic articles, such as wide-mouth containers, the final step in forming the articles is a blow molding step in which a parison is inflated in a blow mold to a desired final configuration. After a given article has cooled sufficiently, it is ejected into a suitable receptacle or onto a conveyor. The articles are then removed manually from the receptacle or conveyor and are manually arranged in stacks. The manual labor involved in these removal and stacking operations has resulted in excessive labor costs, and it would be desirable to mechanize the removal and stacking functions if this can be done more economically.

In accordance with the present invention, it is proposed to eject each plastic article from the blow mold onto an extensible carrier which can be extended into the blow mold to receive the article and then retracted to remove the article from the blow mold. The articles are ultimately to be stacked in a stacking frame, and the stacking frame and extensible carrier are moved relatively to place the carrier in alignment with an opening in the stacking frame. The carrier is then again extended to insert the article into the opening in the stacking frame.

To retain a stack of articles in the stacking frame, the lowermost one of these articles rests on a spring loaded pawl which extends into the path of incoming articles at the opening. The incoming article moves into the opening, depresses the pawl, moves past the pawl, and nests into the stack of articles, lifting the stack from the pawl in the process. The carrier is then retracted, and while retracting, it lowers the stack of articles back down onto the pawl where the stack rests until the next article is inserted. In this manner, articles are removed from the blow molds and stacked in the stacking frame completely automatically.

The apparatus of the invention may be provided with a sensing device to guard against recycling of a container if, for some reason, it is not ejected from the blow mold onto the carrier. The carrier has an internal passage, which opens on the receiving head of the carrier, and when a container seats on the head it closes the passage. Reduced pressure is applied to the passage, and a pressure switch is arranged to operate in response to the reduced pressure. When the container seals to the carrier and is held there by the vacuum, the pressure switch trips and conditions the apparatus to continue its operating cycle. Should a container fail to be ejected, the pressure switch will not be tripped, thereby preventing the apparatus from recycling.

Accordingly, it is an object of the present invention to provide a method of and apparatus for removing articles from a molding machine and for stacking the articles as they are removed, all on a continuous, automatic basis.

Another object of the invention is to remove articles from molds and stack the articles with other like articles employing a single extensible carrier to accomplish both removal and stacking functions.

A further object of the invention is to provide a safety interlock for a removal and stacking device which shuts down the machinery if an article is not transferred to the device at the appropriate time, thereby preventing recycling of the article.

Another object of the invention is to provide a removal and stacking device for molding apparatus wherein a part of the device, which transfers each article to a stack of articles and inserts the article into the stack, may be a simple piston and cylinder.

Another object of the invention is to provide a spring loaded pawl in a stacking frame on which pawl a stack of articles rests, the pawl being depressed to accept a new article as it is nested into the stack and returning to an extended position to catch the stack and hold it until the next article is inserted into it.

Other objects of this invention will appear in the following description and appended claims, reference being had to the accompanying drawings forming a part of this specification wherein like reference characters designate corresponding parts in the several views.

On the drawings:

FIGURE 1 is an elevational view, partly in section, showing molding apparatus provided with an automatic removal and stacking device in accordance with the invention;

FIGURE 2 is the first of a series of views showing the steps of removing and stacking of containers, and in particular shows a rod or piston extended into a container which is ready to be ejected from a blow mold;

FIGURE 3 shows a container being jected onto the extended piston;

FIGURE 4 shows the piston in a retracted position and located below a stacking frame;

FIGURE 5 shows the piston extended and inserting an article into another article in the stacking frame;

Figure 6:
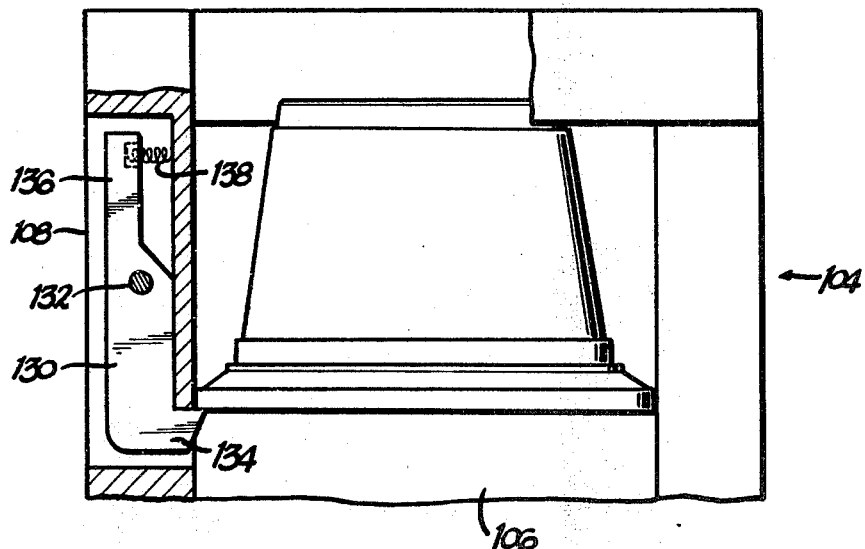
FIGURE 6 shows a pawl mechanism on which the articles in the stacking frame rest.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

An overall molding apparatus 20 is shown in FIGURE 1 and includes an extruder 21 having a hopper 22 mounted on a base 24 which in turn is mounted on an oil reservoir 26. The extruder 21 is of a conventional type in which particulate material is fed into the hopper 22 and from there into a barrel within the extruder which contains a rotating and axially movable extruder screw. The screw rotates to accumulate a charge of plasticized material and is then advanced axially to inject the material through an orifice structure which in the embodiment of FIGURE 1 is located at 28. The orifice block 28 communicates with an injection block 30 which in turn communicates with the extruder 21 to provide a passage for flow of plasticized material through the orifice.

The injection block 30 and the orifice structure 28 are located at an injecting station of the apparatus 20, and also located at the injecting station is a parison block 32 and a cylinder 34 located under the parison block. The cylinder 34 rests on a machine base 36, and the injection block 30 and orifice structure 28 are suspended from an upper machine frame 38. The parison block 32 is supported between the orifice structure 28 and the cylinder 34 by the piston element 40 of the cylinder 34, the piston 40 engaging the bottom end of the parison block 32 and urging it upward to engage the parison block with the injection orifice structure 28. At the top end of the parison block 32 is a parison mold 42 which is clamped against a mold member (not shown) at the under side of the orifice structure 28. The parison is formed in the space within the mold member 42, and the parison originally has a disc shape.

The parison block 32 is carried on an index table 50 and rests on a base portion 52 of that table when the table is first indexed to the position shown in FIGURE 1. The piston 40 of cylinder 34 is at that time beneath the parison block 32 and is extended from the cylinder to raise the parison block 32 and to clamp the parison mold against the orifice block 28. When the parison block 32 is to be indexed away from the injecting station, the piston 40 is withdrawn into the cylinder 34 to lower the parison block 32 back onto the base 52 of index table 50 so that the parison block 32 will be carried by the index table 50 to the blow molding station.

The blow molding station is located to the left of the injecting station as viewed in FIGURE 1. At the blow molding station there is a parison block 60 which is supported on the piston 62 of a cylinder 64 located under the parison block 60 and supported on the machine base 36. A blow mold 56 is suspended from a slide 66 which is connected for sliding movement to the upper machine frame 38. The blow mold 56 is shown at an ejecting station in FIGURE 1, but it will be understood that the blow mold is movable to the blow molding station and takes up a position directly over the parison block 60 as indicated by the dashed line showing of the slide 66 above the parison block 60.

A piston 67 and cylinder 69 are provided with the piston connected to the blow mold 56 for moving the blow mold between the molding and ejecting stations.

At the top of the parison block 60 is a parison mold 70 which is identical to the parison mold 42 at the injecting station. The parison mold 70 at the blow molding station may be clamped to the mouth 58 of the blow mold so as to position a parison directly under the interior opening of the blow mold 56.

Each of the parison blocks 32 and 60 has a plunger 72 and 74, respectively, and the plungers fit in bores 77 and 78 extending through the center of the parison blocks. The purpose of these plungers is to extend the parison axially while the parison is at the blow molding station so as to provide a blowable shape in the blow mold 56. With the apparatus in the condition shown in FIGURE 1, the plunger 74 has already been extended to deflect a parison into the blow mold 56, and the parison has then been blown to conform to the interior configuration of the blow mold. The plunger 74 has also been retracted to the position shown in FIGURE 1, and the blow mold 56 has been moved to the ejecting station where it will eject the container 76.

In order to shift the parison block 32 to the blowing station and simultaneously shift the other parison block 60 to the injecting station, the index table 50 is rotated by actuation of an index drive motor 78. Once the two parison blocks 32 and 60 have been indexed to new stations such that their positions are reversed as compared to FIGURE 1, the pistons 62 and 40 are actuated to clamp the parison molds 42 and 70 respectively to the blow mold 56 and the orifice block 28.

Up to this point, there has been described a molding apparatus of a type for which a removal and stacking device may be provided in accordance with the invention.

As previously mentioned, the blow mold 56 containing a blown container 76 is shown in its position at an ejecting station in FIGURE 1. Also at the ejecting station is a movable carrier 80 which has an extensible plunger 82 and a cylinder 84 which may be operated to extend and retract the plunger 82. The plunger 82 and cylinder 84 are supported within a frame including vertical members 86 and 88 and horizontal cross members 90 and 92. The plunger 82 in the position shown in FIGURE 1 is aligned with the container 76 carried by the blow mold 56. The plunger 82 may be extended by operation of cylinder 84 until the receiving head 94 of the plunger is located within or adjacent the interior of the container 76. The container 76 may then be ejected from the blow mold by operation of an ejection device 96 which also constitutes a cylinder 98 and plunger 100. The plunger 100 is extended to push the container 76 out of the blow mold 56 and onto the receiving head 94 of plunger 82. The plunger 82 is then retracted from the blow mold by operation of the cylinder 84 and carries the container 76 downward out of the blow mold 56.

The entire carrier device 80 may then be moved to the left as viewed in FIGURE 1 until it is located at a stacking station immediately under a stacking frame 104. A cylinder 95 and piston 97 is provided with the piston connected to carried 80 for moving it between the ejecting station and the stacking station. The stacking frame 104, as shown in FIGURE 1, has an opening or mouth 106 and has a cylindrical side wall 108 and a top wall 110. The top wall 110 is affixed to the overhead frame 38 by suitable fasteners such as bolts and nuts. Within the stacking frame 104 there is a stack of containers 112, and it may be noted that the lip 114 of the bottom container in the stack rests upon two pawls 116 and 118 which extend inwardly of the stacking frame at its mouth or opening 106. The container 76 may be nested into the stack of containers 112 by extending the plunger 82 to move the container 76 through the open mouth 106 of the stacking frame into the lowest container 114 in the stack. As the container 76 passes the pawls 116 and 118, it depresses the pawls and lifts the stack of containers off of the pawls. Then when the plunger 82 is retracted to remove it from the stacking frame, the lowermost container in the stack again rests on the pawls 116 and 118 which are returned to their extended position by means of suitable resilient bias such as springs.

The steps of removing a container 76 from the blow mold 56 and inserting this container into the stacking frame 104 are illustrated in FIGURES 2, 3, 4 and 5. In FIGURE 2, the plunger 82 of the carrier 80 is shown in an extended position with its head 94 located in the interior of the container 76 in the blow mold 56. There is a passage 126 which extends along the axis of the plunger 82, and this passage leads to an opening at the end of the receiving head 94 for the plunger 82. The passage 126 is connected to a pressure switch 124 mounted at the side of the frame for the carrier 80, and a flexible hose 128 connects the passage 126 to the switch 124. Reduced pressure is applied to the passage 126 by means of a pump (not shown) which may be connected to the switch 124 and the hose 128.

FIGURE 3 shows the container 76 being ejected from the blow mold 56 by extending the plunger 100 of the ejecting device 96 by operation of the cylinder 98. The container 76 seats on the receiving head 94 of plunger 82 and is held there by the reduced pressure applied to passage 126. The resulting vacuum which is produced in the passage 126 trips the pressure switch 124, and the pressure switch in turn causes the apparatus to proceed with the removal and stacking cycle. If for some reason a container should fail to be ejected from the blow mold 56 the switch 124 would not be tripped, and this would cause the entire apparatus to shut down in order to prevent recycling of the container 76. The pressure switch 124 may be electrically connected into the control circuit for the molding and stacking apparatus so as to cause the apparatus to shut down in the event that the pressure switch 124 is not tripped at the time for ejection of a container from the blow mold.

FIGURE 4 shows the plunger 82 and the container 76 after they have been withdrawn from the blow mold 56 to a retracted position. Also in FIGURE 4, the carrier 80 has been moved to position it under the stacking frame 104 so that the container 76 and plunger 82 are in alignment with the mouth 106 of the stacking frame. It will be understood that it would be possible to keep the carrier 80 stationary and move the stacking frame 104 to a position over the carrier in order to accomplish the stacking function.

FIGURE 5 shows the plunger 82 in a raised position wherein the receiving head 94 and the container 76 have been raised through the opening 106 into the stacking frame. As the container 76 passes the pawls 116 and 118, it depresses the pawls and then lifts the container 120 off the pawls. The container 76 nests inside container 120, and obviously a stack of containers may be built up by continued nesting of containers one inside the other in this manner. When the plunger 82 is retracted by operation of the cylinder 84, the container 76 is lowered onto the pawls 116 and 118 which returned to an extended position after the container 76 passed them. Thus, the stack of containers again rests on the pawls 116 and 118 as shown in FIGURE 5.

FIGURE 6 shows one type of pawl mechanism which may be used in the stacking frame. An arm 130 is pivotally connected at 132 to the wall 108 of the stacking frame. One end 134 of the arm 130 projects inwardly toward the mouth of the stacking frame and is located in the path of a container as it is inserted into the stacking frame. The upper end 136 of arm 130 abuts a spring 138 which biases the arm 130 to the position shown in FIGURE 6. When a container is inserted into the stacking frame, the lower end 134 of the arm pivots in a clockwise direction as does the upper end 136 of the arm, and the spring 138 is compressed as it resists this movement. When the container passes the arm end 134, the spring 138 returns the arm to the position shown in FIGURE 6 with the end 134 extending into the mouth of the stacking frame.

Figure 7:
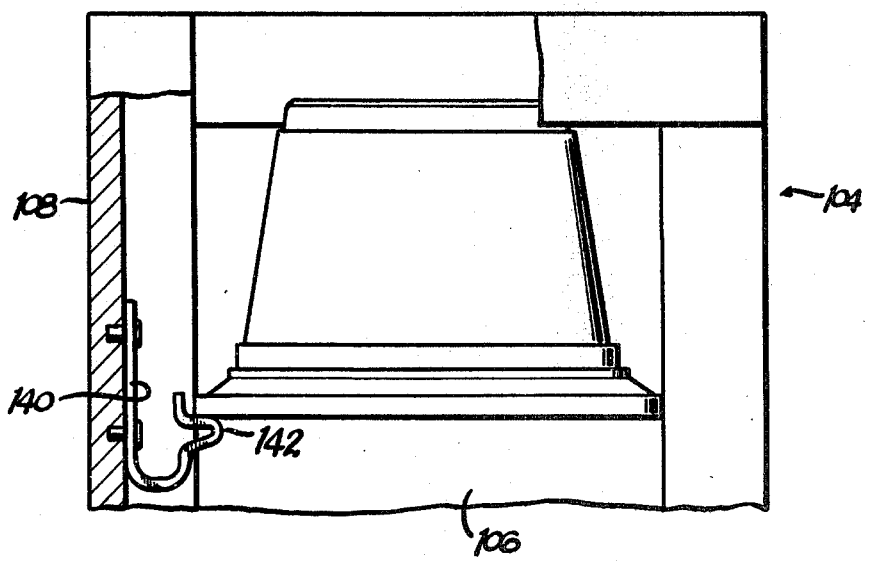
FIGURE 7 shows a modified pawl mechanism.

FIGURE 7 shows an alternate construction for the pawl device of the stacking frame. In this embodiment the pawl device is a wire spring 140 which has a bent portion 142 extending into the opening 106 at the mouth of the stacking frame 104. As a container is inserted into the mouth of the stacking frame, the lip of the container contacts bent portion 142 of spring 40 and bends the spring wire to the left as viewed in FIGURE 7 to allow the container to pass the pawl. After the container passes the bent portion 142 of the spring, the spring returns to its original position extending into the mouth of the stacking frame and catches the stack of containers as it is lowered when the plunger 82 is retracted.

If the containers are sufficiently flexible and resilient, it is possible to make the pawl device rigid so that it forms a stationary stacking ledge in the stacking frame. This can be accomplished, by way of example, by making the wire spring 140 thicker so that it does not bend when a container contacts it as the container is being inserted into the stacking frame. In this case, the lip of the container contacts bent portion 142 of wire 140 and is flexed by the bent portion to allow the container to pass the bent portion. The container returns to its original shape after it passes the bent portion and nests into the stack of containers if there is such a stack already in the stacking frame. When the plunger 82 is retracted, the bent wire portion 142, acting as a stacking ledge, catches the stack of containers and holds them in the stacking frame.

It is evident from the foregoing description that the invention has successfully mechanized the functions of removing containers from a molding machine and automatically stacking those containers. As a result, inefficient hand labor has been eliminated. The removal and stacking mechanism of the invention is straightforward and reliable in operation, and can be expected to have a long useful life. The invention incorporates a safety interlock device which prevents containers from being recycled in the event that no container is ejected from the blow mold at the time for such ejection. The removal and stacking mechanism operates entirely automatically and does not require the attention of an operator.

We claim:

1. In a method of making plastic articles wherein a plastic parison is formed in a parison mold and is blown in a blow mold into an article having a configuration allowing the same to be stacked with other like articles, the combination therewith of the steps of placing a carrier in an article receiving position adjacent said blow mold, ejecting an article from said blow mold onto said carrier, relatively moving said carrier and a stacking frame into alignment with each other, inserting said carrier with said article thereon into said stacking frame, retaining said article in said stacking frame by catching the same on a pawl, withdrawing said carrier from said stacking frame, an opening being provided in said carrier in a position so that said opening is blocked by an article received from said blow mold, said method further including the steps of applying reduced pressure to said opening to establish a vacuum in said opening when said opening is blocked by an article, sensing the pressure in said opening, and stopping the operation of said carrier in response to a failure of reduced pressure in said opening at the time for ejection of an article from said blow mold onto said carrier.

2. The method of claim 1 in which upon inserting said carrier and said article into said stacking frame, said article is nested with other articles arranged in a stack in said stacking frame.

3. In a method of making plastic articles wherein a plastic parison is formed in a parison mold and is blown in a blow mold into an article having a configuration allowing the same to be stacked with other like articles, the combination therewith of the steps of placing a carrier member in an article receiving position adjacent said blow mold, ejecting an article from said blow mold onto said carrier member, withdrawing said carrier member with said article thereon from said blow mold, relatively moving said article and a stacking frame into alignment with each other, inserting said article into said stacking frame, retaining said article in said stacking frame by catching the same on a stacking ledge, an opening being provided in said carrier in a position so that said opening is blocked by an article received from said blow mold, said method further including the steps of applying reduced pressure to said opening to establish a vacuum in said opening when said opening is blocked by an article, sensing the pressure in said opening, and stopping the operation of said carrier in response to a failure of reduced pressure in said opening at the time for ejection of an article from said blow mold onto said carrier.

4. In an apparatus for molding plastic articles of a configuration allowing the articles to be stacked, a stacking device comprising a stacking frame having an opening therein adapted to receive articles to be stacked in said frame, resiliently biased pawl means mounted on said stacking frame at said opening, said pawl means being operable to be depressed by an article being inserted into said opening of said stacking frame and returning to an extended position to hold said article in a stack of like articles in said stacking frame, a carrier having a position adjacent said stacking frame and having an extensible portion for carrying an article, said carrier including means for extending said extensible portion to insert an article into said opening of said stacking frame and for retracting said extensible portion to engage said article with said pawl means, said extensible portion of said carrier having an opening therein which is blocked by an article when received on said extensible portion, said apparatus further including means applying reduced pressure to said opening so that reduced pressure exists in said opening when said opening is blocked, and switching means responsive to a failure of reduced pressure in said opening when an article is not received by said extensible portion to stop the operation of said apparatus, and said apparatus further including a blow mold from which articles are supplied to said carrier and in which apparatus said carrier is movable between said position adjacent said stacking frame and another position adjacent said blow mold, said extending and retracting means of said carrier further serving when said carrier is located at said another position to extend said extensible portion into said blow mold to receive an article therefrom and to retract said extensible portion from blow mold for movement of said carrier to said position adjacent said stacking frame.

5. The apparatus of clam 4 in which said pawl means comprises a pivotal member having a catch portion normally extended into said opening of said stacking frame, means mounting said member for pivotal movement relative to said stacking frame allowing said member to pivot to a depressed position, and means resiliently urging said member to a position wherein said catch portion is extended into said opening.

6. The apparatus of claim 4 in which said pawl means comprises a wire spring having a catch portion normally extended into said opening of said stacking frame, said wire spring resiliently urging said catch portion thereof towards said extended position and allowing said catch portion to be depressed by an article when inserted into said opening of said stacking frame.

7. The apparatus of claim 4 in which said carrier includes a hydraulic cylinder and said extensible portion of said carrier comprises a plunger actuated by said cylinder.

8. In an apparatus for molding plastic articles having a parison mold in which a plastic parison is formed and a blow mold in which the parison is blown to a final configuration which allows the articles to be stacked, the improvement of a device for receiving the articles from said blow mold and for stacking said articles, said device comprising a stacking frame having an opening therein adapted to receive articles to be stacked, resiliently biased pawl means mounted on said stacking frame at said opening, said pawl means being operable to be depressed by an article being inserted into said opening of said stacking frame and returning to an extended position to hold said article in a stack of like articles in said stacking frame, a movable carrier having a first position adjacent said blow mold and a second position adjacent said stacking frame, said carrier having an extensible portion, and means for (1) extending said extensible portion into said blow mold to receive an article from said blow mold with said carrier in said first position thereof, (2) retracting said extensible portion with said article carried thereby while moving said carrier to said second position, and (3) again extending said extensible portion to insert said article into said opening in said stacking frame with said carrier in said second position thereof, means for moving said carrier between said first and second positions thereof, said extensible portion of said carrier having an opening therein which is blocked by an article when received on said extensible portion, and said apparatus further including means applying reduced pressure to said opening so that reduced pressure exists in said opening when said opening is blocked, and switching means responsive to a failure of reduced pressure in said opening when an article is not received by said extensible portion to stop the operation of said apparatus.

9. In an apparatus for molding plastic articles having a parison mold in which a plastic parision is formed and a blow mold in which the parison is blown to a final configuration which allows the articles to be stacked, the improvement of a device for receiving the articles from said blow mold and for stacking said articles to facilitate handling of the articles, said device comprising a stacking column having an axis and an opening therein concentric with said axis for receiving the articles therein, a movable carrier having one position adjacent said blow mold and having another position adjacent said stacking column, said carrier having an extensible portion (1) for receiving an article from said blow mold with said carrier in said one position thereof, (2) for carrying said article while said carrier is moved to said another position thereof, and (3) for inserting said article into said opening of said stacking column with said carrier in said another position, said carrier including means for extending and retracting said extensible portion, resiliently urged pawl means mounted on said stacking column, said pawl means being depressed by an article when inserted into said stacking column and returning to an extended position to hold the article in a stack of like articles in said stacking column, said extensible portion of said carrier having an opening therein which is blocked by an article when received on said extensible portion, and said apparatus further including means applying reduced pressure to said opening so that reduced pressure exists in said opening when said opening is blocked, and switching means responsive to a failure of reduced pressure in said opening when an article is not received by said extensible portion to stop the operaton of said apparatus.

10. In an apparatus for molding plastic articles of a configuration allowing the articles to be stacked, a stacking device comprising a stacking frame having an opening therein adapted to receive articles to be stacked in said frame, a stacking ledge mounted on said stacking frame at said opening and projecting into said opening a distance sufficient to catch articles when they are inserted into said opening, a carrier having a position adjacent said stacking frame and having an extensible portion for carrying an article, said carrier including means for extending said extensible portion to insert an article into said opening of said stacking frame and for retracting said extensible portion to engage said artcle with said stacking ledge, said extensible portion of said carrier having an opening therein which is blocked by an article when received on said extensible portion, said apparatus further including means applying reducing pressure to said opening so that reduced pressure exists in said opening when said opening is blocked, and switching means responsive to a failure of reduced pressure in said opening when an article is not received by said extensible portion to stop the operation of said apparatus, and said apparatus further including a blow mold from which articles are supplied to said carrier and in which apparatus said carrier is movable between said position adjacent said stacking frame and another position adjacent said blow mold, said extending and retracting means of said carrier further serving when said carrier is located at said another position to extend said extensible portion into said blow mold to receive an article therefrom and to retract said extensible portion from blow mold for movement of said carrier to said position adjacent said stacking frame.

References Cited

UNITED STATES PATENTS

| 1,431,702 | 10/1922 | Smend et al. | |
| 2,294,273 | 8/1942 | Buxbaum. | |
| 2,625,329 | 1/1953 | Wells. | |
| 2,744,369 | 5/1956 | Seragnoli | 214—6.2 X |
| 3,118,176 | 1/1964 | Freedman et al. | |

ROBERT F. WHITE, Primary Examiner

T. J. CARVIS, Assistant Examiner

U.S. Cl. X.R.

18—5; 214—6; 264—97, 335